United States Patent [19]

Kroon

[11] 4,415,368
[45] Nov. 15, 1983

[54] METHOD OF PURIFYING SOIL POLLUTED BY OIL

[75] Inventor: Hendrik A. Kroon, Berg aan de Maas, Netherlands

[73] Assignee: H. A. Kroon B.V., Berg aan de Maas, Netherlands

[21] Appl. No.: 288,455

[22] Filed: Jul. 30, 1981

[30] Foreign Application Priority Data

Aug. 1, 1980 [NL] Netherlands ......................... 8004420

[51] Int. Cl.³ ........................... B08B 3/02; B08B 7/04
[52] U.S. Cl. ..................................... 134/10; 134/25.1; 210/806
[58] Field of Search ................. 134/10, 25.1; 210/806; 241/1, 5, 39

[56] References Cited

U.S. PATENT DOCUMENTS

| | | | |
|---|---|---|---|
| 2,381,760 | 8/1945 | Latham | 210/806 X |
| 2,821,346 | 1/1958 | Fisher | 241/39 |
| 3,723,309 | 3/1973 | Garcia | 210/806 X |
| 3,764,008 | 10/1973 | Darley et al. | 210/806 X |

*Primary Examiner*—Marc L. Caroff
*Attorney, Agent, or Firm*—Owen, Wickersham & Erickson

[57] ABSTRACT

A method of purifying hydrocarbon polluted soil. The polluted soil, mixed with water and air, is sucked into a conduit. Meanwhile, water under high pressure is ejected from a jet pipe as a substantially conical water curtain. The sucked-in soil is then passed through the water curtain, which removes the pollutants, and the thereby-purified soil-water mixture is ejected.

8 Claims, 2 Drawing Figures

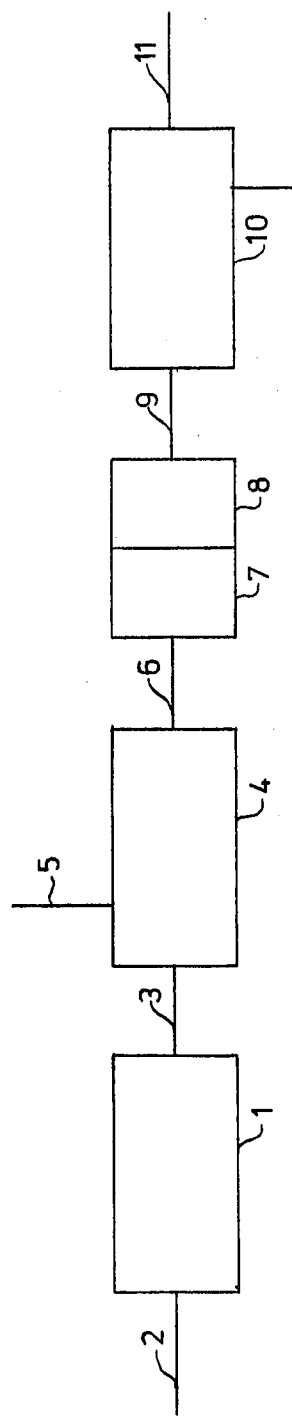
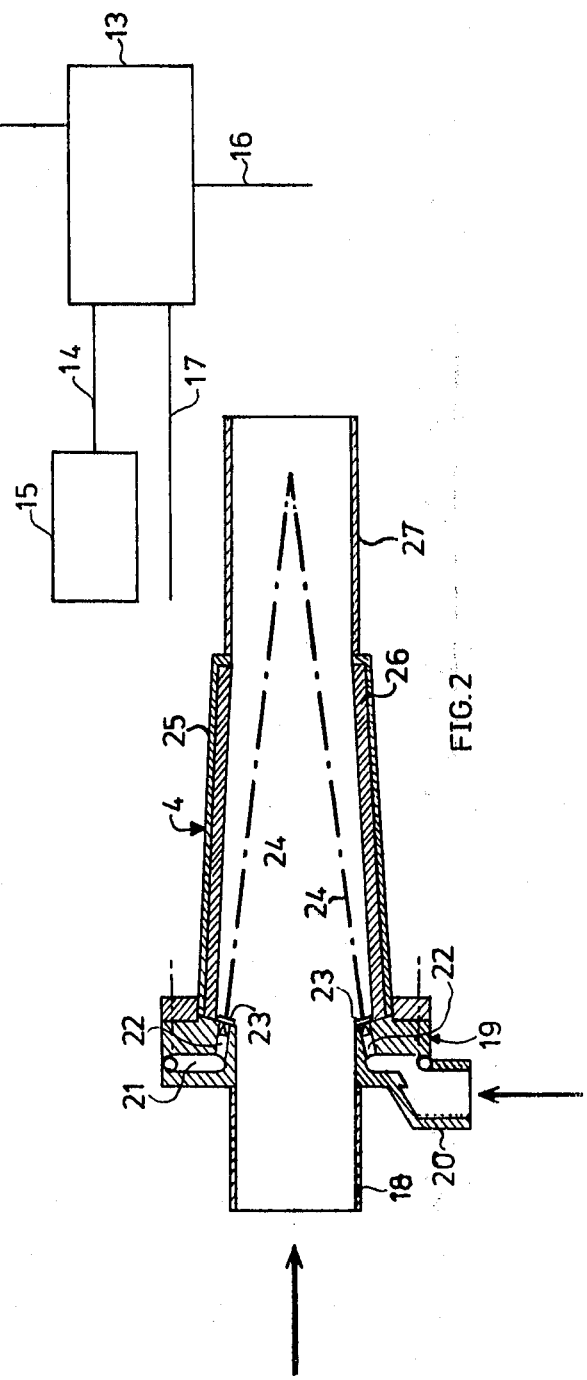

METHOD OF PURIFYING SOIL POLLUTED BY OIL

The invention relates to a method of purifying polluted soil, particularly of purifying soil polluted by oil, hydrocarbons or the like.

In the event of accidents or the like it often occurs that the soil is polluted by oil or the like in a given region, In many cases large quantities of soil may be involved, which have to be dug out and cleaned.

Dumping such polluted soil on a site particularly designated for this purpose brings about the risk of pollution of the ground water in the neighbourhood of the dumping site in the course of time. Moreover, fairly suitable dumping sites are hardly available nowadays.

Incineration of the polluted soil produces combustion residues noxious to the environment, which again have to be dumped on a special site involving the inconveniences mentioned above with respect to the deposition of refuse on dumping sites. In addition, the incineration requires much energy and hence considerably high costs.

From German Patent Application No. 2,531,732 a method is known in which the polluted soil is first comminuted in order to obtain a most homogeneous composition of the soil. Then the soil is mixed with hot water at atmospheric pressure in a mixing drum.

A disadvantage of this method is that much energy is consumed, without, however resulting in an effective purification of all material, since the interior of earth lumps and the like is not affected drastically.

Furthermore, Dutch Patent Application No. 6,809,068 discloses a method of purifying oil-polluted mud, which is introduced into a vessel and then hot water vapour is directed across or into the mud in order to stir the same, whilst inter alia by reducing the viscosity of the oil it is endeavoured to produce a separation between the solid mud particles and the oil. After the supply of hot water vapour is cut off, the mixture is allowed to settle, after which the superjacent water and accompanying oil is removed.

Apart from the disadvantage or discontinuity of this method processing only comparatively small quantities, this method also requires particularly high amounts of energy so that also this method is proportionally very expensive.

The invention has for its object to provide a method of the kind set forth in which the disadvantage involved in the methods hitherto known can be avoided.

According to the invention this can be achieved by sucking up the polluted soil, which may be mixed with water, with the aid of a jet pipe included in a conduit, whilst with the aid of water introduced in the form of a water curtain at high pressure a subatmospheric pressure is generated and the sucked-in soil is passed across this water curtain for being conducted away as a mixture with this water.

In the method according to the invention employing non-heated water the water supplied at high pressure to the jet pipe can not only displace the polluted soil, but also wash the same very intensely and effectively so that the soil passing across the water curtain produced by the pressurized water is completely broken up into its elementary fragments, which fragments are vigourously struck by the pressurized water, the impurities adhering thereto being thus disengaged.

The method is to a high extent insensitive to the composition of the polluted soil and without any objection coarse particles such as gravel and the like can be processed, whilst in principle all impurities especially substances not or hardly soluble in water are separated from the soil.

The resultant mixture of purified soil, water and impurities can then be disintegrated by methods and equipments known in this technology.

The invention will be described more fully hereinafter with reference to the accompanying Figures.

FIG. 1 schematically illustrates the disposition of a preferably mobile equipment for carrying out the method embodying the invention.

FIG. 2 shows a jet pipe employed in the device of FIG. 1.

The device shown in FIG. 1 comprises a high pressure pump 1, to which water is supplied in operation through a supply duct 2. With the aid of an outlet duct 3 connected with the high-pressure pump 1 pressurized water can be supplied to a jet pipe 4. With the jet pipe 4 communicate a suction duct 5 and a pressure duct 6. The pressure duct 6 connects the jet pipe with a passage space 7 formed, for example, by a trough or a tank.

The material contained in the passage space 7 can be conducted with the aid of a dipping pump 8 through a duct 9 to a de-sanding system 10 known per se, where the solid substance can be conducted away as is schematically indicated at 11.

The de-sanding system 10 communicates through a duct 12 with a known device 13 for separating oil and water, where superjacent oil can be conducted away through a duct 14 to a collecting reservoir 15. The separated, solid substances can be conducted away through a duct 16 and water can be conducted out of the separating device 13 through a duct 17.

The jet pipe used in the device according to the invention is shown in detail in FIG. 2. This jet pipe is provided with a preferably circular-section tubing 18, to one end of which is fastened a jet producing crown 19. The jet producing crown 19 is provided with a connecting stub 20 for connecting the aforesaid outlet duct 3 of the high-pressure pump 1. The connecting stub 20 communicates with an uninterrupted annular channel 21 provided in the jet producing crown 19, in which channel open out bores 22 made in the crown 19. The bores 22 are equipped with spray nozzles 23 so that the centre lines 24 of the outlet orifices of the spray nozzles are at angle to the longitudinal axis of the jet pipe, as will be apparent from FIG. 2.

With the side of the jet producing crown 19 remote from the tubing 18 is connected one end of a sheath 25. This sheath has a slightly conical shape and is lined with a wear-resistant synthetic resin 26. The end of the sheath 25 remote from the jet producing crown 19 is joined by a preferably cylindrical tubing 27 for connecting the jet pipe with the above-mentioned pressure duct 6.

The tubing 18 serves to establish a connection between the jet pipe and the above-mentioned suction duct 5.

The equipment is preferably mobile so that it can be readily moved towards and on the site of the polluted soil. In order to facilitate such movements the various ducts are preferably flexible, whilst during operation the jet pipe, suspended for example from a crane jib, can be shifted in place across the site of the polluted soil.

When a given ground surface is polluted, at least part of the polluted surface will preferably be bounded on one side by driving a pile wall into the ground, on one side of which a pit can be dug to a depth where the soil is no longer polluted. If the soil dug out is also polluted, it may be dumped on the other side of the pile wall. Then the soil to be purified can be loosened with the aid of pressurized water and the loosened soil mixed with water can be directly sucked in through the suction duct 5. In order to generate this suction force water at a high pressure, preferably more than 50 bars, is supplied with the aid of the pump 1 to the jet producing crown 19. This water enters through the nozzles 23 the interior of the jet pipe and forms a curtain of substantially conical shape, two generatrices of which are formed by the centre lines 24 of the spray nozzles indicated in FIG. 2.

As a result a subatmospheric pressure will be produced in the tubing 18 of the jet pipe, with which the suction duct 5 is connected. Thus the above-mentioned mixture of polluted soil and water is sucked in and compelled to move across the water curtain formed by the water supplied at high pressure through the nozzles 23. This pressurized water exerts hevy forces on the soil sucked in so that the soil will be comminuted down to its elementary particles, whilst any impurities adhering thereto will be disengaged from said particles.

The material thus subjected to a thorough treatment will be supplied through the pressure duct 6 connected with the tubing 19 of the jet pipe to the passage space formed by the trough 7.

From this trough the mixture of water, soil and impurities are supplied to a de-sanding equipment 10 of known type with the aid of which the major portion of the solid constituents of the mixture will be removed in known manner in the form of purified soil. The remainder of the mixture, which will at least mainly consist of water and impurities such as oil is supplied through the duct 12 to a conventional device for separating oil and water. In this device any residual solid soil particles will settle down, whereas the oil particles will float on the water. This separation of oil particles may, if desired, be promoted by the addition of a flocculation agent. The superjacent oil layer will be conducted away through the overflow 14 to a collecting reservoir 15. The soil settled down in the device 13 is conducted away through the duct 16 and the water through the duct 17. The duct 17 may be connected with the high pressure pump 1 so that it can again be employed.

The effect of the jet pipe depends on the pressure to which the water supplied to the jet pipe is subjected, on the amount of water supplied to the jet pipe per unit time, on the number of spray nozzles and the construction thereof, particularly on the size of the passage of these spray nozzles. A further influence is exerted by the disposition of the spray nozzles with respect to the shape, particularly, the vertex of the conical water curtain produced in operation.

Owing to the above-described, substantially conical structure of the sheath 25, chosen in accordance with the shape of the conical water curtain and owing to the lining of said sheath of wear-resistant synthetic resin 26 loss of energy and wear are minimized during operation.

During operation it is preferably ensured that a given quantitiy of air is sucked in with the soil to be purified in order to obtain optimum whirl of the material in the jet pipe. The amount of air sucked in as well as the diameter of the jet pipe have an influence on the amount of polluted soil that can be processed per unit time. The various parameters mentioned above can be optimized according to circumstances.

If necessary by adding chemicals to the water by which the polluted soil is initially loosened and/or to the water supply at high pressure the purification of the soil to be processed can be further promoted. Example:

A mixture of sand, loam and gravel in a ratio of 3:1:0.1 polluted by 8% of crude oil was treated by using a jet pipe equipped with three spray nozzles 23 having each a bore of 4 mms.

Each hour 30 cubic meters of water was supplied to the jet pipe at a pressure of 250 bars. The rate of flow of the water emerging from the nozzles 23 was 221 ms/sec.

By way of example it can be noted that in these circumstances a ground surface of 1 m$^2$ could be subjected to a force of $3.10^7$ Newton.

Under the conditions described above 15 to 20 cubic meters of polluted soil was processed every hour.

After the treatment of the polluted soil the oil content in the purified soil was not more than 0.1% by weight, whilst the oil content of the waste water was 5 ppm.

I claim:

1. A method of purifying polluted soil containing hydrocarbon impurities, employing a jet pipe in a conduit, comprising forming a substantially conical water curtain in said jet pipe from water under high pressure moving at high velocity generally in a downstream direction in the jet pipe,
   thereby generating subatmospheric pressure upstream of the water curtain,
   sucking with said subatmospheric pressure a mixture of the polluted soil, air, and water into the jet pipe and through said water curtain in the downstream direction, and
   then conducting away the resulting mixture.

2. A method as claimed in claim 1 comprising supplying the mixture of soil and water conducted away from the jet pipe to a separating station and then separating the soil from the water which then contains the impurities.

3. A method as claimed in claim 2, including returning the purified soil to a pit dug in or near an original site of the polluted soil.

4. A method as claimed in claim 2 comprising separating the water from the impurities.

5. A method as claimed in claim 1 comprising loosening the soil to be purified utilizing pressurized water while simultaneously sucking the loosened soil in said mixture of air and water into the jet pipe.

6. A method as claimed in claims 1 through 5 wherein the forming step comprises supplying the water to the jet pipe at a pressure of at least 50 bars.

7. A method as claimed in claim 6 comprising supplying the water to the jet pipe at a pressure of about 250 bars.

8. A method of purifying oil-polluted soil employing a jet pipe in a conduit, comprising
   forming a generally conical water curtain in said jet pipe from water under high pressure, introduced from a jet-producing crown with nozzles positioned peripherally in the jet pipe and oriented to converge in a downstream direction,
   thereby generating subatmospheric pressure upstream of the water curtain, loosening the soil at a situs to be purified by impinging water under pressure thereon, sucking a mixture of the polluted loosened soil, air, and water into the jet pipe and through said water curtain in the downstream direction, thereby comminuting the soil and loosening the oil from the soil, conducting away the resulting mixture to a separation station, separating the soil from the water and the oil contained in the water and returning the soil to the situs, and separating the water from the oil.

* * * * *